Figure 1:
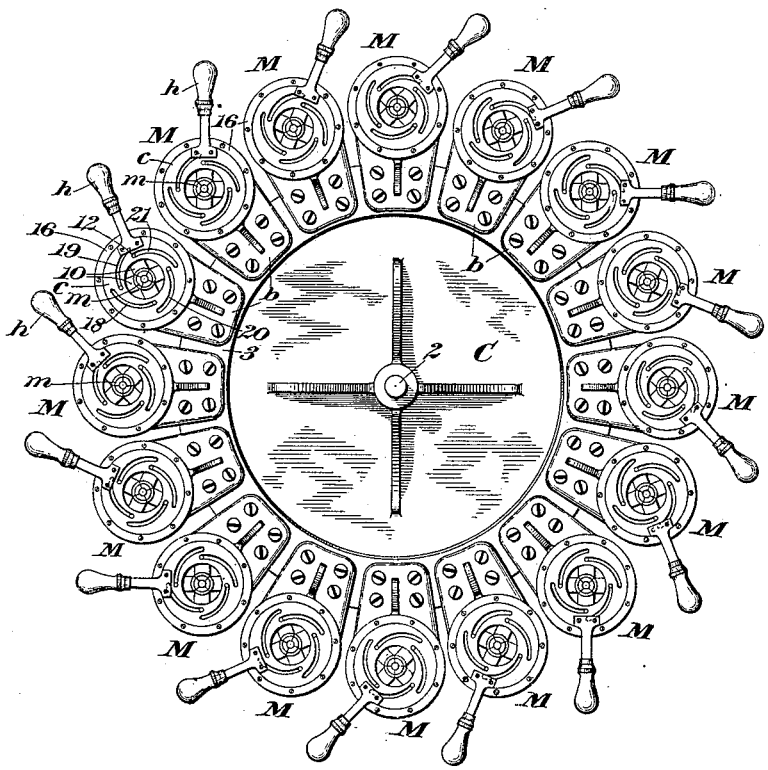

No. 614,843. Patented Nov. 29, 1898.
J. E. CRIGGAL.
MOLDING MACHINE.
(Application filed Nov. 4, 1897.)

(No Model.) 2 Sheets—Sheet 1.

Witnesses:
P. J. Hewitt
Fred. J. Dole.

Inventor:
John E. Criggal.
By his Attorney,
F. H. Richards.

No. 614,843. Patented Nov. 29, 1898.
J. E. CRIGGAL.
MOLDING MACHINE.
(Application filed Nov. 4, 1897.)
(No Model.) 2 Sheets—Sheet 2.
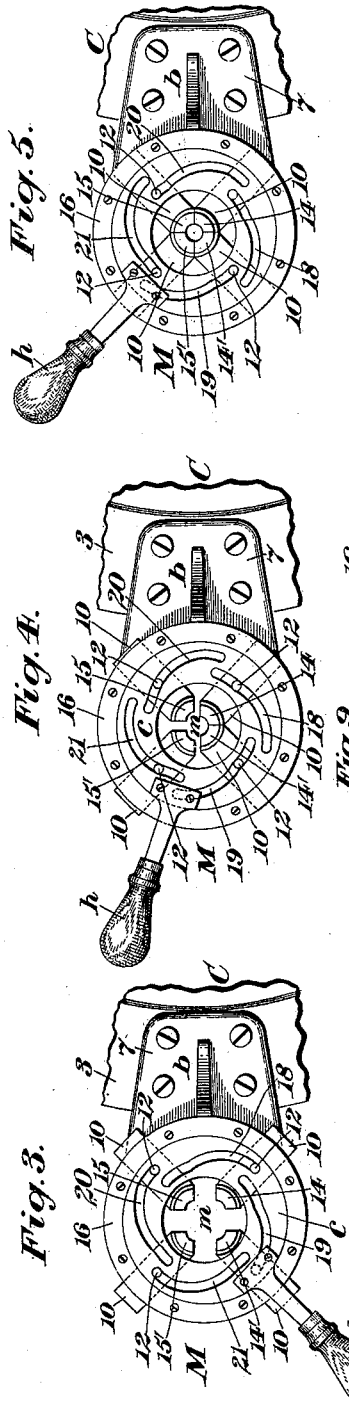
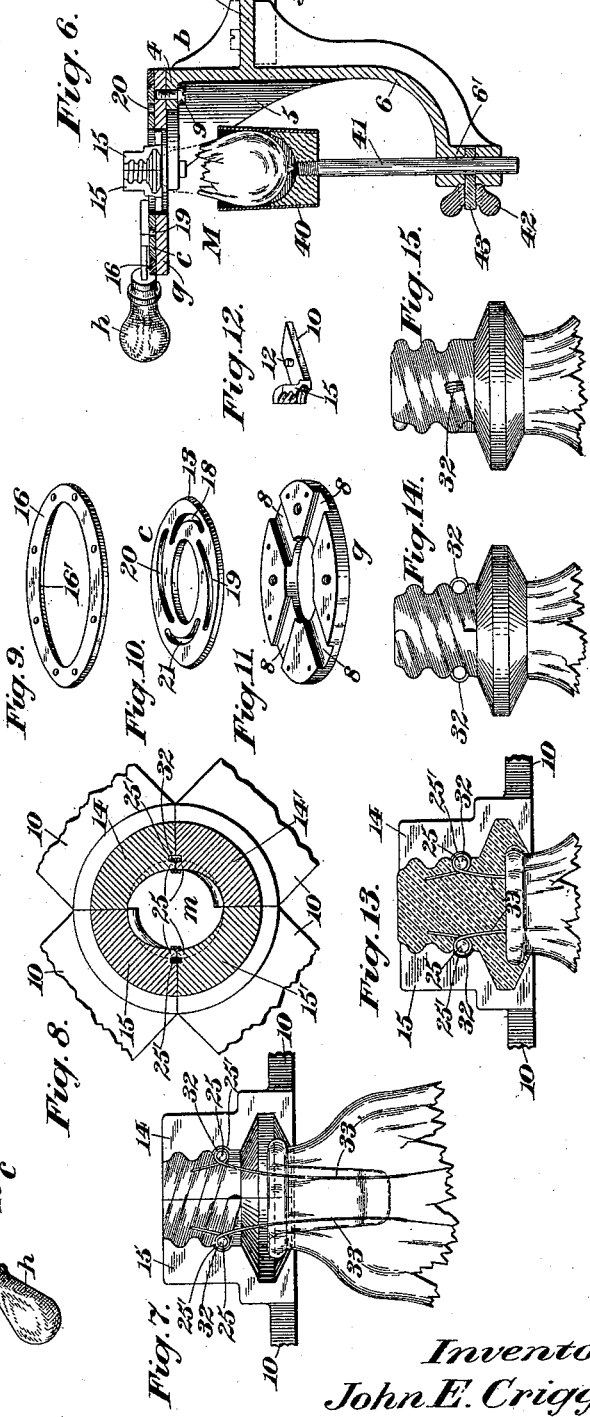
Witnesses:
F. G. Hewitt
Fred. J. Dole.
Inventor:
John E. Criggal.
By his Attorney,
F. H. Richards.

UNITED STATES PATENT OFFICE.

JOHN E. CRIGGAL, OF NEWARK, NEW JERSEY.

MOLDING-MACHINE.

SPECIFICATION forming part of Letters Patent No. 614,843, dated November 29, 1898.

Application filed November 4, 1897. Serial No. 657,350. (No model.)

*To all whom it may concern:*

Be it known that I, JOHN E. CRIGGAL, a citizen of England, residing in Newark, in the county of Essex and State of New Jersey, have invented certain new and useful Improvements in Molding-Machines, of which the following is a specification.

This invention relates to improvements in molding-machines; and it has for its main object the provision of an improved apparatus of this class by means of which articles can be molded readily and quickly; and more particularly the invention relates to a machine for molding the lamp-bases of incandescent electric lamps, and especially for molding these bases onto the necks of the lamps of which they are intended to form parts.

In the preferred form thereof illustrated in the drawings of this application my improved machine comprises a plurality of separately-operable molding devices or molds, all of which are supported on a common carrier preferably mounted for rotation on a support, suitable operating means being employed for enabling an attendant to close or open any one of the molds independently of all of the others and to mold a large number of lamp-bases one at a time, which lamp-bases may be left in the molds and allowed to set after the latter are closed. Each of these molding devices will comprise as its essential features a separable mold made up of two or more mold-sections, each carried by a suitable support, and operating means connected with each of the mold-sections, so that all of said sections may be operated at certain times substantially simultaneously to open or close the mold.

Preferably each mold will be so constructed that one or more of the sections thereof may be closed by the operating means before the other mold section or sections, and usually I will employ two differentially-operative pairs of mold-sections in which the sections of one pair will open or close, as the case may be, before those of the other and in which the sections of each individual pair will be simultaneously operative and will move in unison.

For the purpose of operating the several sections of each molding device in the manner described I prefer to support each mold-section upon a suitable slide carried by a support and to operate all of these slides, and hence the mold-sections of each mold, by means of a cam-plate having a turning movement and also slotted to form cam-grooves or otherwise so shaped as to embody a plurality of cam-faces, one for each slide, preferably disposed so as to form two dissimilar pairs of similar cam-grooves or cam-faces. This cam-plate may be turned by means of a lever or other suitable member to shift the slides, and hence the mold-sections, it being obvious that if the cam-plate is constructed as just stated two of the mold-sections may be caused to move together and to close before the other sections of the mold are closed.

My improved molding-machine is especially designed and intended for molding lamp-bases not only around the necks of incandescent-electric-lamp bulbs, but also around the outer ends of the leading-in wires, and especially around hooks or eyes formed in said wires and similar in a general way to the eyes in the leading-in wires of the lamps shown and described in my prior patent, No. 457,109, dated August 4, 1891, the machine being especially adapted for molding these lamp-bases around coils or helices in the leading-in wires, as shown herein. As the correct positioning of these eyes or helices is a prerequisite to the proper molding of the lamp-base around the leading-in wires of the lamp-bulb, my improved mold also embodies as an essential feature thereof suitable means for engaging and locking these eyes or helices, or at least one of them, prior to the completion of the molding operation, and this is the principal reason why I prefer to make use of a mold in which two or more sections thereof close simultaneously in advance of the other sections of the mold, the sections that close first being preferably provided with devices for engaging and locking at least one of the coils or helices in the leading-in wires.

Figure 2:
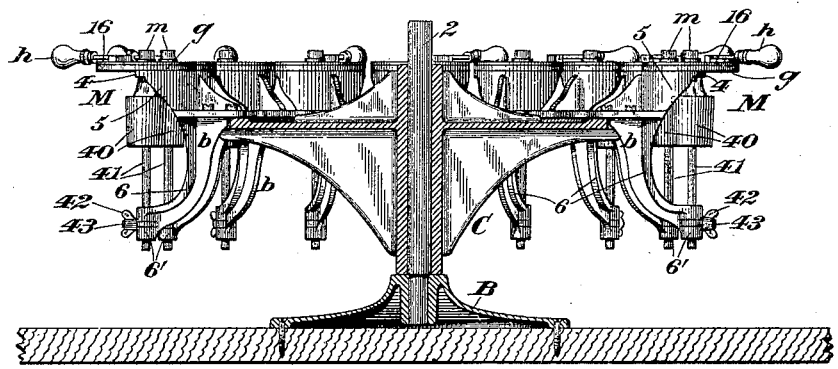

In the drawings accompanying and forming part of this specification, Figure 1 is a plan of a molding-machine embodying my present improvements. Fig. 2 is a sectional side elevation of the same, the section being taken substantially through the center of the machine. Fig. 3 is an enlarged detail illustrating one of the molding devices with the mold open. Fig. 4 is a similar view showing the mold partly closed. Fig. 5 is a similar view showing the mold entirely closed. Fig. 6 is a vertical section of one of the molding devices, showing the manner in which an incandescent-lamp bulb may be supported in position to have the base molded thereonto. Fig. 7 is an enlarged side elevation illustrating two of the sections of the mold and looking toward the inner side thereof, this view illustrating a lamp-bulb and its coiled leading-in wires in operative relation with the mold-sections, with the coils or helices in the wires properly located by such mold-sections. Fig. 8 is a horizontal sectional detail showing the mold closed and illustrating the manner in which the coils or helices in the leading-in wires are positioned. Fig. 9 is a perspective view of a retaining-ring for holding in place the cam plate or ring by means of which the slides and the mold-sections are operated. Fig. 10 is a similar view of the cam plate or ring. Fig. 11 is a similar view of a support or guide for the slides. Fig. 12 is a similar view of one of the slides and a mold-section carried thereby. Fig. 13 is a sectional detail similar to Fig. 7, showing the mold filled and the lamp-base molded around the leading-in wires, the helices in said wires, and the lamp-neck. Fig. 14 is a detail illustrating in side elevation the neck of a lamp-bulb having a base molded thereonto, this view being taken in the same position as that shown in Fig. 13; and Fig. 15 is a view similar to Fig. 14 and looking from the right in said figure.

Similar characters designate like parts in all the figures of the drawings.

The several operative parts of my improved molding-machine may be mounted in any suitable manner—as, for instance, on a base, such as B, supporting a fixed vertical stud or shaft, such as 2, on which may be journaled for rotation a carrier or frame, such as that shown at C, on which will be mounted usually a circuit of separately-operable molding devices, all substantially similar in construction to the molding device to be described hereinafter in detail. In the present instance sixteen of these molding devices are shown, each of which is designated in a general way by M.

Each of the molding devices M may be supported in any suitable manner by the carrier C; but preferably each separate molding device will be operatively mounted on a bracket detachably connected to the rim 3 of the carrier C. Each of these brackets is designated in a general way by $b$ and embodies as its essential features a sole or support proper, such as 4, a web or rib, such as 5, a depending outwardly-curved hanger, such as 6, having at the lower end thereof a bearing 6' for a purpose to be described hereinafter, and a fastening-plate, such as 7.

As hereinbefore stated, the essential features of each molding device are a separable mold embodying a plurality of mold-sections and operating means connected with each of such sections in such a manner as to be capable of shifting all of the sections substantially simultaneously to open or close the mold.

The slides by which the mold-sections are preferably carried may be mounted in suitable guideways—for example, in guideways, such as 8, in a guide-ring, such as $g$, which may be secured by means of screws, such as 9, to the sole 4 of the bracket. The slides, which are intended to reciprocate in the guideways 8, form in this instance, with a suitable cam-plate, the operating means by which the several mold-sections of each molding device are moved to open or close the mold.

In the preferred construction each mold-section is secured to or formed integral with one of the slides, this construction being illustrated clearly in Fig. 12, in which the mold-section 15 is formed integral with a slide 10, four of which slides, all similar in construction, may be employed. Each slide has projecting therefrom some suitable means for engaging a cam-groove face of the cam-plate, this means being usually a pin, such as 12, adapted to engage in a cam-groove of the cam-plate. The cam-plate may be substantially of the type shown in detail in Fig. 10 and is indicated herein by $c$. This cam-plate will usually have therein four cam-grooves disposed in two dissimilar pairs, the two grooves of each pair being substantially similar in every respect, so as to permit the slides operated thereby to move simultaneously and to substantially the same extent. The cam-grooves of one pair are designated herein by 18 and 19 and of the other pair by 20 and 21. At its outer edge the cam-plate $c$ may be beveled, as shown at 13, and this beveled face is intended in this instance to be engaged by a correspondingly-beveled internal face 16' of a holding or retaining ring, such as 16, by means of which the cam-plate may be held in place on the guide-ring $g$. The manner in which these parts are connected will be obvious by referring to Fig. 6. The holding-ring 16 may be secured to the guide-ring $g$ in any suitable manner, these two members preferably having screw-holes therein for the reception of corresponding screws. Between these parts the cam-plate $c$ will be held so that it may rotate freely, and the pins 12 of the slide 10 will of course work in the grooves in the cam-plate.

Obviously the central openings in the guide-ring $g$ and in the cam-plate $c$ should be large enough to permit the several sections of the mold to open wide when it is desired to remove a molded article from the machine.

The mold proper employed herein, as before stated, will be a separable one, and it is herein indicated in a general way by $m$.

While any suitable number of mold-sections may be employed, I prefer to make use of a mold divided into four parts, such as those shown at 14 14' and 15 15', the two sections 14

14' being controlled in their movements by the cam-grooves 18 and 19, respectively, while the mold-sections 15 and 15' are controlled by the cam-grooves 20 and 21, respectively. These cam-grooves are so formed that the mold-sections 14 and 14' will be entirely closed, when the cam-plate is properly turned, before the two mold-sections 15 and 15' close. Moreover, the several mold-sections will usually have coacting guides, preferably in the form of bosses, in alinement with the inner surface of the mold and facing toward each other in pairs for the purpose of engaging and positioning one or both of the loops or helices formed in the usual leading-in wires of an incandescent electric lamp. This will be clear by referring to Figs. 7 and 8, in which 25 25 represent two pairs of oppositely-facing bosses adapted to come in contact with each other when the mold is closed and to enter the coils or helices just referred to for the purpose of positioning the latter.

If the leading-in wires 33 of the lamp-bulb are intended to be positioned in the grooves of the threaded shank, the bosses 25 should of course form parts of the threads of the mold, a suitable space, such as 25', being left at the back of each of these bosses to receive one side of each coil or helix to be positioned.

The cam-plate may be turned in any suitable manner; but I prefer to secure thereto a small operating handle or lever, such as that shown at $h$, by means of which the cam-plate may be turned and all of the mold-sections operated substantially simultaneously, although, of course, they will not move in unison, as the shapes of the cam-grooves are such that the two mold-sections 14 14' will start to close before the mold-sections 15 and 15' and will finish their closing movement before the latter are entirely closed.

For the purpose of properly supporting the lamp-bulb upon which a base is to be molded I may make use of any device suitable for that purpose—such, for instance, as a cupped holder of the type, (indicated at 40 and shown clearly in Fig. 6.) This holder may be secured to a stem 41, passing through the bore in the bearing 6' of the hanger 6, and said stem may be secured in place in any desired adjusted vertical position, as by means of a wing-nut, such as 42, carried on the threaded end of a clamping draw-pin, such as 43. Preferably the walls of the cupped holder 40 will be made of parchment, as this forms a suitable medium for engaging and clasping the glass of the lamp-bulb without injuring the latter.

The manner in which my improved molding-machine is operated will be apparent from the foregoing description. A lamp-bulb is first placed in the holder 40, after which the latter is adjusted at the proper height by means of the wing-nut 43, which height should of course be determined by the point at which the mold-sections come in contact with the neck of the lamp-bulb, this being clearly indicated in Fig. 7. The handle $h$ is then turned to bring the two mold-sections 14 and 14' together and at the same time clamp one of the helices 32 between the bosses 25. The handle $h$ is turned further to bring the other two mold-sections 15 and 15' (see Fig. 4) together, and at the same time the other helix 32 is guided between the bosses 25. The mold is now ready to receive the insulating material, which is introduced through the opening in the top of the mold, whereupon the molding device used will be left with the mold in its closed position, so as to permit the lamp-base to set and dry, and the next molding device of the circuit (shown in Figs. 1 and 2) may be operated in the same manner. By the time the circuit of the machine is completed the insulating material or plaster in the first molding device will have set sufficiently and a new series of lamps may have bases molded thereonto.

During the operation just described the workman need not move from one position, as by turning the carrier C he may bring any molding device opposite him.

Of course in practice the molds should be oiled for the purpose of preventing sticking of the composition thereto, some suitable insulating-oil being preferably employed for this purpose.

Having described my invention, I claim—

1. In a molding-machine, the combination, with supporting means, of a plurality of differentially-movable slides carried by said supporting means; a separable mold embodying mold-sections carried, respectively, by said respective slides; and operating means connected with each of said mold-sections for imparting differential opening and closing movements to the mold-sections.

2. In a molding-machine, the combination, with supporting means, of a separable mold embodying two differentially-operable pairs of simultaneously-operative mold-sections carried by said supporting means, and operating means connected with each of said mold-sections for imparting differential opening and closing movements to said pairs of mold-sections.

3. In a molding-machine, the combination, with supporting means, of a separable mold embodying mold-sections carried by said supporting means and having coacting guides substantially in alinement with the inner surface of the mold, and operating means for shifting said sections to open or close the mold.

4. In a molding-machine, the combination, with supporting means, of a separable circular mold embodying mold-sections carried by said supporting means and having coacting oppositely-facing bosses substantially in alinement with the inner surface of the mold and in position to come in contact with each other on the closing of the mold, and operating means for shifting said sections to open or close the mold.

5. In a molding-machine, the combination, with supporting means, of a cam-plate carried by, and mounted to turn relatively to, said supporting means and having dissimilar cam-grooves; slides carried by said supporting means and having pins engaging the walls of said respective cam-grooves; and a separable mold embodying differentially-operative mold-sections carried, respectively, by said respective slides.

6. In a molding-machine, the combination, with supporting means, of a cam-plate carried by, and mounted to turn relatively to, said supporting means and having two dissimilar pairs of similar slide-actuating cam-grooves; two pairs of slides carried by said supporting means; and a separable mold having two differentially-operative pairs of similarly-operative mold-sections carried, respectively, by said respective slides.

7. In a molding-machine for molding lamp-bases on the necks of incandescent-electric-lamp bulbs, the combination, with supporting means, of a separable lamp-base mold embodying mold-sections carried by said supporting means; operating means connected with each of said mold-sections for shifting said sections to open or close the mold; and a cupped lamp-bulb holder for engaging the lamp-bulb and positioning the same during the molding of the lamp-base.

8. In a molding-machine for molding lamp-bases on the necks of incandescent-electric-lamp bulbs, the combination, with supporting means, of a separable lamp-base mold embodying mold-sections carried by said supporting means; operating means connected with each of said mold-sections for shifting said sections to open or close the mold; and a cupped lamp-bulb holder having its axis coincident with that of the mold and adjustable toward and from the latter, and adapted to engage the lamp-bulb and position the latter during the molding of the lamp-base.

JOHN E. CRIGGAL.

Witnesses:
WILLIAM D. KELLOGG,
CECIL H. MACMAHON.